April 18, 1967 C. WAGNER 3,314,416
GAS FIRED PRESSURIZED DEEP FAT FRYER
Filed April 8, 1965 4 Sheets-Sheet 1

INVENTOR.
Chester Wagner
BY
Wood, Herron and Evans
ATTORNEYS

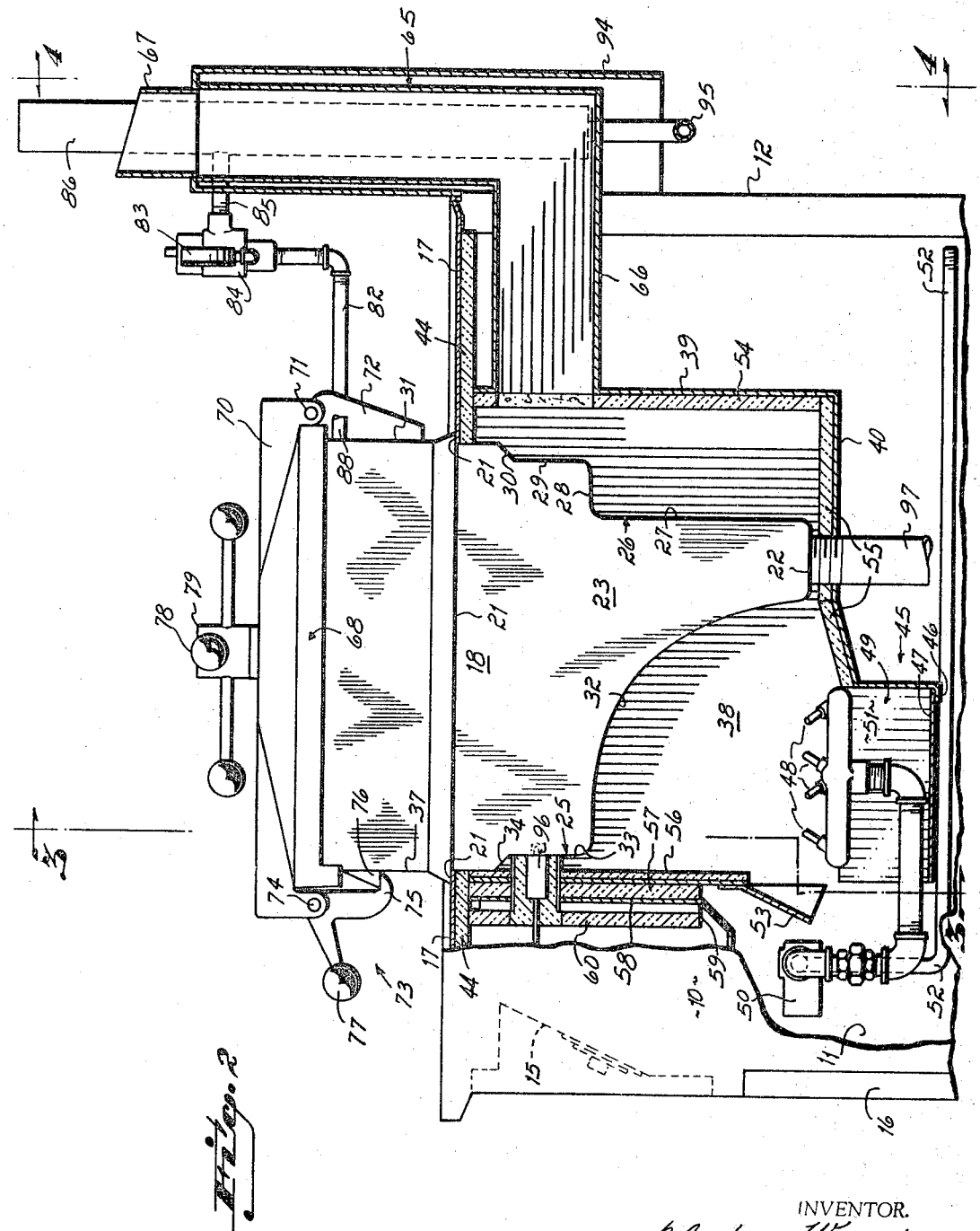

April 18, 1967   C. WAGNER   3,314,416
GAS FIRED PRESSURIZED DEEP FAT FRYER
Filed April 8, 1965   4 Sheets-Sheet 3

INVENTOR.
Chester Wagner
BY
Wood, Herron & Evans
ATTORNEYS

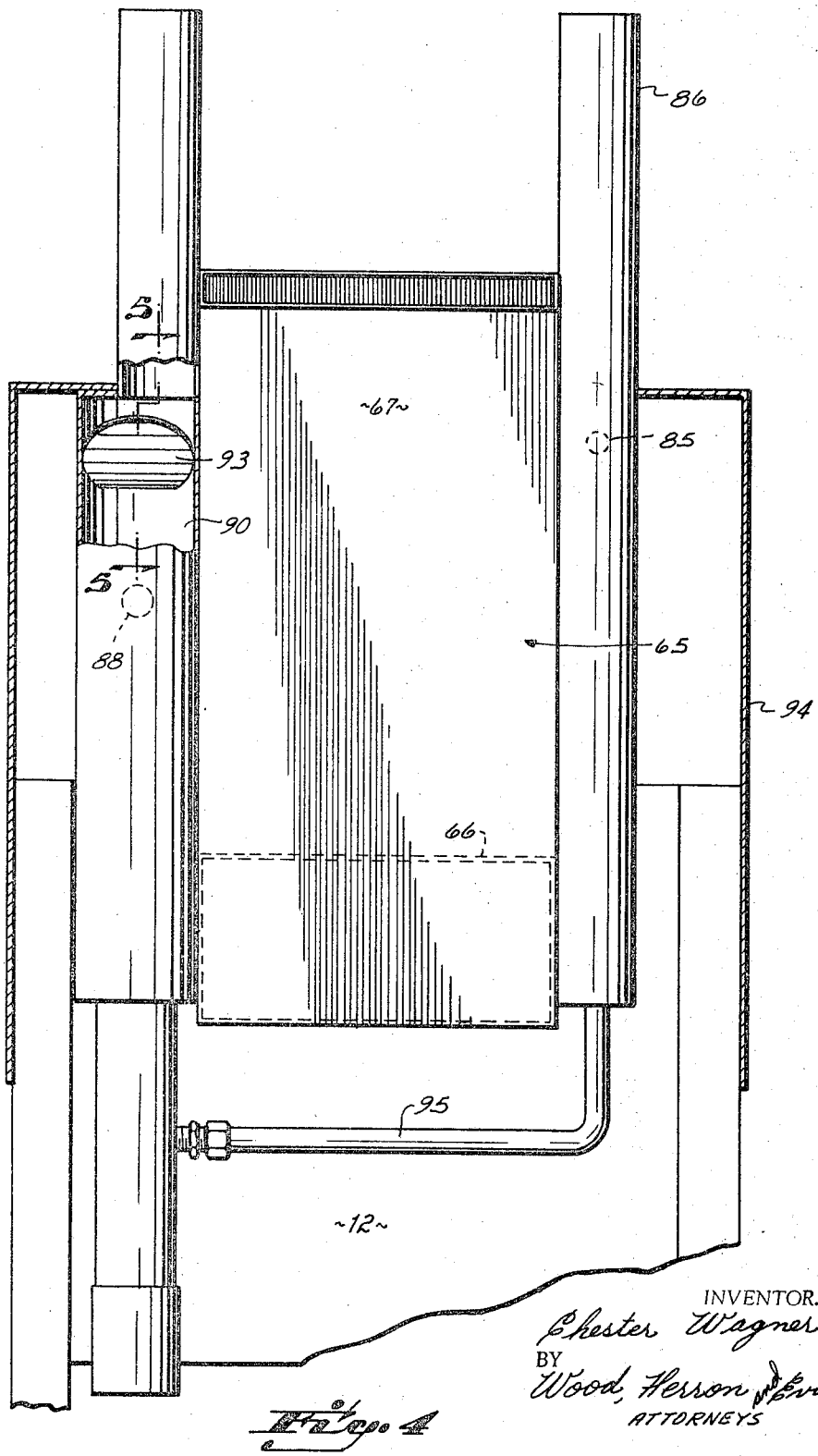

United States Patent Office 3,314,416
Patented Apr. 18, 1967

3,314,416
GAS FIRED PRESSURIZED DEEP FAT FRYER
Chester Wagner, 217 N. Barron St.,
Eaton, Ohio 45320
Filed Apr. 8, 1965, Ser. No. 446,585
9 Claims. (Cl. 126—369)

This invention relates to a pressurized deep fat fryer and, more particularly, to a pressurized deep fat fryer in which there is automatic control of temperature, pressure, and operating time.

As explained in my prior U.S. Patents No. 2,778,736 and No. 2,914,063, the deep fat in which food is being fried is maintained within a specified temperature range for a specified length of time with the maximum pressure within the pressure sealed fryer being limited. In the aforesaid patents, electric heating means have been employed to heat the deep fat within the pot of the pressurized fryer and maintain it in desired temperature range. A thermostatic control has been employed to maintain the temperature of the fat within the desired range.

In this type of deep fat frying, it is highly desirable to maintain a "cold" zone within the pot of the pressurized fryer with the source of heat applied to the cooking fat above this cold zone. This prevents the cold zone from being subject to turbulence so that particles of the food, which become loose while being fried, may collect within the cold zone from which they may be readily removed. Thus, the cold zone is the lowest portion of the pot of the deep fat fryer. The word "cold" as used herein means that the temperature within the cold zone is at an appreciably lower temperature than the area within the pot above it.

When electric heat is used, the heat is easily applied at the desired area by means of heating elements to insure that a cold zone is formed therebeneath. However, electric heating is not suitable for cooking purposes in all areas due to various reasons such as cost, for example. Thus, where gas is more economically feasible as an energy source, it is desirable to heat the fat within the pot of the deep fat fryer by gas.

However, when gas is used as the source of heat with the presently available pots, it is difficult to create the desired cold zone in the pot while efficiently using the gas. The present invention satisfactorily solves this problem by employing a pot having a unique structural configuration wherein a cold zone is provided and the portion of the pot thereabove is efficiently heated by gas burners.

The fryer may have its exhaust ducts, which are used to vent the pot either when the pressure exceeds a desired value or when the frying time period ends, disposed adjacent a non-insulated outside wall, for example. When this occurs, moisture, which comes from the food being fried within the pot, may freeze within the exhaust ducts because of the proximity of the exhaust ducts to a low temperature. This primarily occurs after the pot is shut down at night.

Likewise, some of the oil of the cooking fat escapes through the exhaust ducts. This oil congeals at room temperature. Therefore, if either of the exhaust ducts should be blocked by the moisture freezing or oil congealing when the initial operation begins after shut down, an explosion or other damage could occur.

The present invention satisfactorily solves the foregoing problems by placing the exhaust flue from the heating chamber in heat exchange relation with the two exhaust or vent ducts. As the products of combustion from the gas burners pass through the exhaust flue, any frozen moisture or congealed oil within either of the exhaust or vent ducts is automatically returned to its liquid state during the initial start-up period so as to not block the exhaust or vent ducts. Thus, since the products of combustion escape up the exhaust flue before the pressure increases within the pot, the danger of an explosion or other possible damage from frozen moisture or congealed oil in the exhaust or vent ducts is eliminated.

The attached drawings illustrate a preferred embodiment of the invention, in which:

FIGURE 4 is a rear elevational view, partly in section, taken along the line 4—4 of FIGURE 2.

FIGURE 5 is a sectional view taken along the line 5—5 of FIGURE 4.

Figures 1, 2:
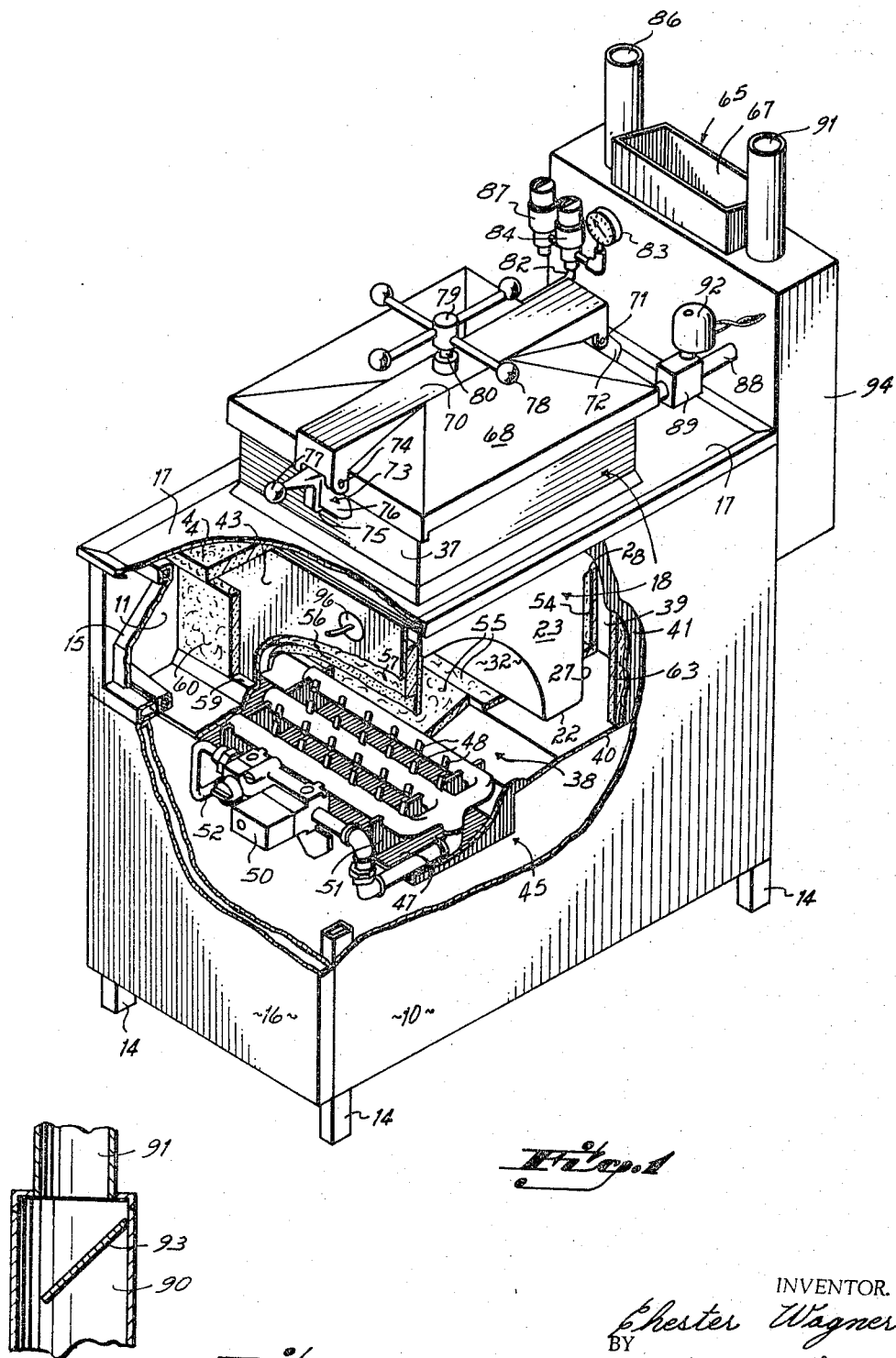
FIGURE 1 is a perspective view, partly broken away, of the pressurized deep fat fryer of the present invention.
FIGURE 2 is a sectional view, partly in side elevation, of a portion of the structure of FIGURE 1.

Referring to the drawings and particularly to FIGURES 1 and 2, there is shown the pressurized deep fat fryer of the present invention. The fryer, which is preferably formed of stainless steel, includes side walls 10 and 11 and a rear wall 12. The fryer is supported by a plurality of legs 14, which are attached to the side walls 10 and 11 and the rear wall 12 by suitable means such as welding, for example. The front of the fryer has its upper portion closed by a slanting wall 15 while a hinged door 16 closes the lower portion.

The tops of the side walls 10 and 11, the rear wall 12, and the slanting wall 15 are connected to a substantially horizontal top wall 17 by suitable means such as welding, for example. The top wall 17 of the fryer functions as a counter top and has a substantially rectangular opening therein to receive and support a rectangular shaped pot 18 in which food is to be fried.

Figure 3:
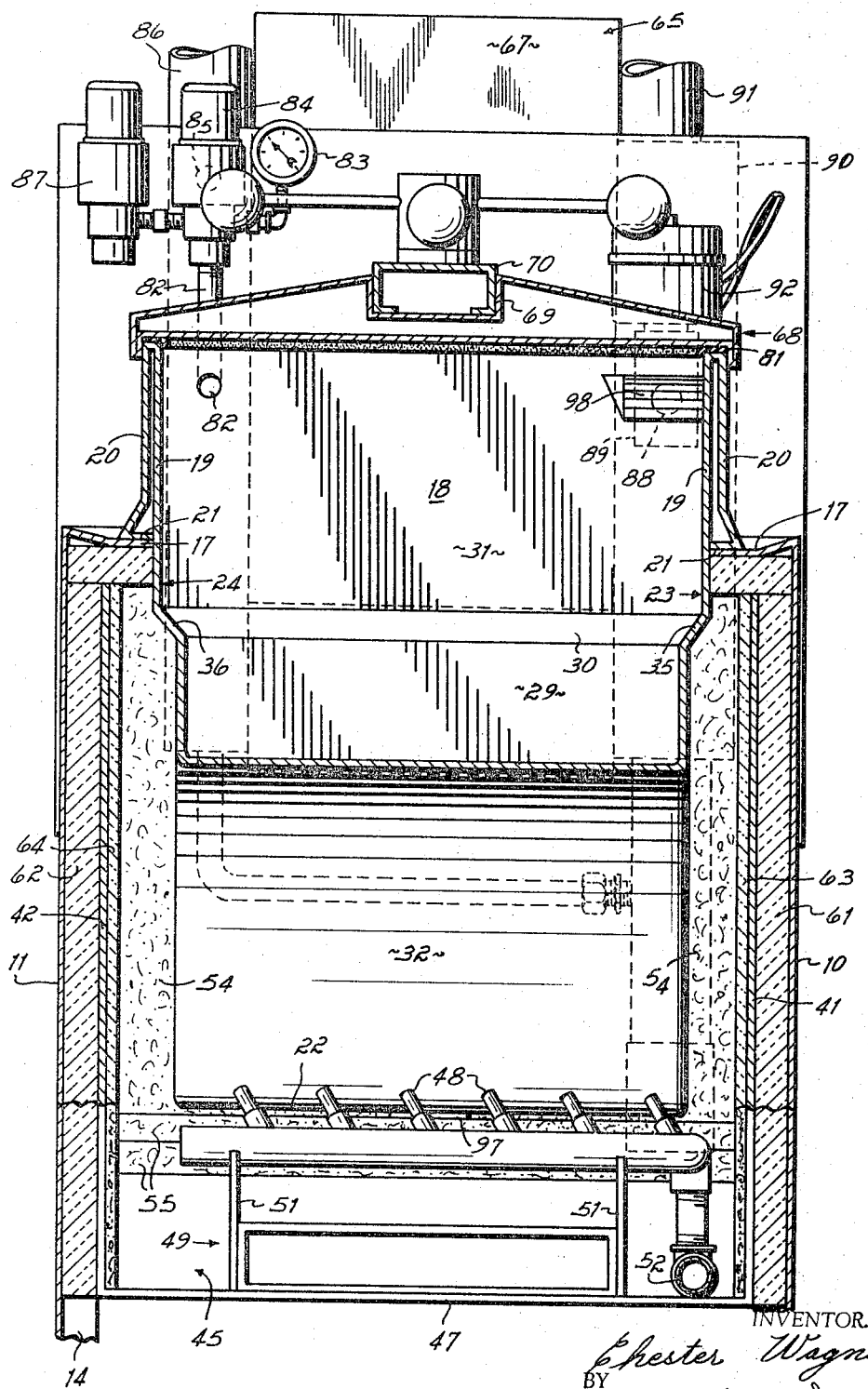
FIGURE 3 is a sectional view, partly in elevation, taken along the line 3—3 of FIGURE 2.

As shown in FIGURE 3, each of the walls of the pot 18 is formed as a double wall in the portion, which is exposed above the top wall 17. This double wall arrangement protects one from being severely burned if accidental contact should be made with the exposed portion of the pot 18.

The double wall arrangement includes an inner wall 19 and an outer wall 20 with an air space therebetween. The lower portion of the outer wall 20 extends outwardly at an angle and then extends inwardly to form a base 21, which is attached to the inner wall 19 to form the air space therebetween. The base 21 rests on the top wall 17 to support the pot 18 on the top wall 17.

The pot 18 is formed by a bottom wall 22, side walls 23 and 24, a front wall 25, and a rear wall 26. It should be understood that the uppermost part of each of the side walls 23 and 24, the front wall 25, and the rear wall 26 has the previously described double wall arrangement.

As shown in FIGURE 2, the rear wall 26 of the pot 18 includes a first portion 27 extending upwardly from the rear edge of the bottom wall 22 and substantially perpendicular thereto. The rear wall 26 has an L-shaped second portion, which includes a first part 28 substantially perpendicular to the first portion 27 and a second part 29 substantially parallel to the first portion 27 of the rear wall 26.

The rear wall 26 has a third portion 30, which extends upwardly and outwardly from the top of the second part 29 of the second portion at an angle to the second part 29. The rear wall 26 terminates in a fourth portion 31, which is substantially parallel to the first portion 27 and the second part 29 of the second portion, extending upwardly from the top of the third portion 30.

The front wall 25 includes a first portion 32, which extends upwardly from the front edge of the bottom wall 22 and curves away from the rear wall 26 as shown in FIGURE 2. The first portion 32 of the front wall 25 extends the same vertical distance from the bottom wall 22 as the first portion 27 of the rear wall 26 whereby they cooperate with each other and the side wall 23 and 24 to form a first substantially rectangular cross sectional area within the pot 18 with the size of the area increasing from the bottom wall 22. The side walls 23 and 24 remain parallel to each other throughout the first area.

The front wall 25 has a second portion 33, which is disposed substantially parallel to the second part 29 of the L-shaped second portion of the rear wall 26 and extends upwardly for the same distance as the second part 29. The second portion 33 of the front wall 25 cooperates with the second part 29 of the second portion of the rear wall 26 and the side walls 23 and 24 to form a second substantially rectangular cross sectional area in the pot 18 of substantially constant size. This second area is greater than the maximum of the first area due to the substantially horizontal first part 28 of the second portion of the rear wall 26 extending away from the first portion 27 of the rear wall 26. As shown in FIGURE 3, the side walls 23 and 24 are parallel to each other throughout the second area.

The front wall 25 has a third portion 34, which slants upwardly and outwardly from the second portion 33 at the same angle as the third portion 30 of the rear wall 26 extends from the second part 29 of the second portion of the rear wall 26. As shown in FIGURE 3, the side walls 23 and 24 have slanting portions 35 and 36, respectively, which extend at the same angle as the third portion 30 of the rear wall 26 and the third portion 34 of the front wall 25. Thus, the third portion 30 of the rear wall 26, the third portion 34 of the front wall 25, and the slanting portion 35 of the side wall 23, and the slanting portion 36 of the side wall 24 extend upwardly for the same distance and cooperate to form a third substantially rectangular cross sectional area, which increases in size from the size of the second area.

The front wall 25 has a fourth portion 37, which is substantially parallel to the fourth portion 31 of the rear wall 26 and extends upwardly for the same distance as the fourth portion 37 of the rear wall 26. The side walls 23 and 24 also extend upwardly in substantially parallel relation to each other from the tops of the slanting portions 35 and 36 for the same distance as the fourth portion 31 of the rear wall 26 and the fourth portion 37 of the front wall 25 to cooperate with the fourth portion 31 of the rear wall 26 and the fourth portion 37 of the front wall 25 to form a fourth substantially rectangular cross sectional area of constant size, which is equal to the maximum size of the third area. This fourth area has the double wall construction in its upper part to prevent accidental burning.

From the foregoing, the pot has four substantially rectangular cross sectional areas extending from the bottom wall 22 upwardly. Each area is equal to or larger than the area beneath it.

When gas heat is applied to the upper part of the first or curved portion 32 of the front wall 25, cooking fat within the pot 18 is heated. However, the fat, which is disposed in the first area adjacent the bottom wall 22 of the pot 18 will be in a cold zone because of the configuration of the pot 18.

A heating chamber 38 is formed within the fryer to receive the portion of the pot 18 beneath the top wall 17. The heating chamber 38 includes a rear wall 39, a bottom wall 40, substantially parallel side walls 41 and 42, and a front wall 43, which is substantially parallel to the rear wall 39.

The top wall 17 of the fryer forms the top of the heating chamber 38. An insulating liner 44, which is preferably Fiberglas, is attached to the bottom surface of the top wall 17 to prevent the top wall 17 of the fryer from becoming too hot because of the heating chamber 38.

The bottom wall 40 has a downwardly extending portion 45, which terminates in a lip 46. The bottom edges of the side walls 41 and 42 of the heating chamber 38 are joined together by a bottom connecting wall 47, which has its rear edge resting on the lip 46 of the bottom wall 40. The side walls 41 and 42 are attached by suitable means (not shown) such as bolts and nuts, for example, to the side walls 10 and 11, respectively, of the fryer.

A plurality of gas burners 48 is supported on a bracket 49, which is supported by the bottom connecting wall 47. The gas burners 48 are part of a unit including a pilot generator 50. The gas burner structure is supported by upstanding walls 51 of the bracket 49 as shown in FIGURE 3.

The gas burners 48, which have gas supplied thereto through an inlet pipe 52 (see FIGURE 3), are arranged so that the jets emerging therefrom impinge on the upper part of the first or curved portion 32 of the front wall 25 of the pot 18. The jets impinge on each other so that the heat is not directed towards the lowermost part of the first or curved portion 32 of the front wall 25. This impingement by the gas burners 48 results in formation of the cold zone in the portion of the pot 18 beneath the heated part of the first portion 32 of the front wall 25 and above the bottom wall 22.

In order that the gas burner structure may be properly positioned and supported within the heating chamber 38, the front wall 43 of the heating chamber 38 terminates above the bottom wall 40 to provide an opening to the chamber 38. A deflector 53 is attached to the lower end of the front wall 43 to prevent the gas jets from being subjected to air currents exterior of the heating chamber 38 whereby the direction of the jets might be altered. As shown in FIGURE 2, the deflector 53 extends beneath the outlet of the gas burners 48.

An insulating liner 54 is attached to the inner surface of the rear wall 39 of the heating chamber 38. An insulating liner 55 is secured to the inner surface of the bottom wall 40 of the heating chamber 38. The insulating liners 54 and 55 are preferably Fiberglas.

The front wall 43 of the heating chamber 38 has an insulating liner 56, which is preferably Cerefelt, attached to its inner surface. A second insulating liner 57, which is preferably Fiberglas, is positioned on the outer surface of the front wall 43 of the heating chamber 38.

A wall 58 is disposed in contact with the outer surface of the insulating liner 57. The wall 58 extends downwardly and curves towards the front for attachment adjacent the lower end of the slanting wall 15 of the fryer. The wall 58 has a lip or flange 59 extending toward the front of the fryer to support the bottom of an insulating liner 60, which is spaced from the wall 58 and is preferably Fiberglas.

An insulating liner 61 (see FIGURE 3) is disposed between the side wall 41 of the heating chamber 38 and the side wall 10 of the fryer. An insulating liner 62 is positioned between the side wall 42 of the heating chamber 38 and the side wall 11 of the fryer. The insulating liners 61 and 62 are preferably Fiberglas.

The side wall 41 of the heating chamber 38 also has an insulating liner 63 on its inner surface. Similarly, the side wall 42 of the heating chamber 38 has an insulating liner 64 on its inner surface. The insulating liners 63 and 64 are preferably Fiberglas. Thus, the insulating liners function not only to maintain the heat within the heating chamber 38 but also to prevent the side walls 10 and 11 of the fryer from being heated to a temperature that would cause one to be burned by contact with the side walls 10 and 11 of the fryer.

The exhaust gases from the heating chamber 38 escape through an exhaust flue 65, which has a substantially rectangular shaped cross section. The exhaust flue 65 includes a substantially horizontal portion 66, which connects with the heating chamber 38 through its rear wall 39 adjacent the top thereof, and a substantially vertical portion 67, which extends upwardly from the horizontal portion 66. Thus, the products of combustion from the heating chamber 38 escape through the exhaust flue 65.

The open top of the pot 18 is closed by a cover 68. The cover 68 has a longitudinal slot or groove 69 formed in its top as shown in FIGURE 3. A rigid lock bar 70 is positioned within the groove 69 of the cover 68. The rear end of the lock bar 70 is pivotally connected by a pin 71 to a lug 72, which is attached to the fourth portion 31 of the rear wall 26 and preferably formed integral therewith.

The front end of the lock bar 70 has a latch 73 pivotally connected thereto by a pin 74. The latch 73 has a hook extension 75 for cooperation with a lip 76 on the fourth portion 37 of the front wall 25 of the pot 18 and preferably formed integral therewith. The latch 73 has a handle 77 for grasping thereof.

A spindle 78 has its hub 79 attached to the upper end of a rod 80, which extends downwardly from the hub 79 through the lock bar 70 and into a plate (not shown) of the cover 68. As more particularly shown and described in the aforesaid U.S. Patent No. 2,914,063, the rod 80 is threaded and provides a connection between the bar 70 and the cover 68.

When the cover 68 and the bar 70 are pivoted about the pin 71 to the closed position of FIGURE 2, the hook extension 75 of the latch 73 is moved under the lip 76 of the pot 18 through actuation of the handle 77. When the spindle 78 is turned, the cover 68 causes strong downward pressure to be exerted between a gasket 81 (see FIGURE 3) and the top of the pot 18 to provide a pressure seal therebetween. This operation is more specifically described in the aforesaid U.S. Patent No. 2,914,063.

An exhaust pipe 82 extends through the fourth portion 31 of the rear wall 26 and communicates with the interior of the pot 18. The pipe 82 has a pressure gauge 83 to indicate the pressure within the interior of the pot 18. The pipe 82 has its outlet blocked by a control valve (not shown) in an exhaust vent 84. The exhaust vent 84 is adjusted to allow automatic relief of the pressure within the pot 18 when the pressure exceeds a predetermined value, for example nine p.s.i. as more particularly described in the aforesaid U.S. Patent No. 2,914,063.

When the pressure exceeds this predetermined value, the control valve of the exhaust vent 84 moves to an open position to connect the pipe 82 with a pipe 85, which communicates with a substantially vertical exhaust duct 86, which has a circular cross section. The exhaust duct 86 is substantially larger than the pipe 85 and the pipe 82 so that it reduces the pressure by diffusion when it enters the duct 86. The upper end of the exhaust duct 86 extends a substantial distance above the top of the vertical portion 67 of the flue 65.

For safety, a second exhaust vent 87 communicates with the pipe 82. If the control valve in the exhaust vent 84 should fail to operate, a control valve (not shown) in the exhaust vent 87 opens to connect the pipe 82 with the atmosphere when the pressure in the pot 18 exceeds a safe value, for example 14 p.s.i.

A second exhaust pipe 88 extends into the interior of the pot 18 through the fourth portion 31 of the back wall 26 for communication with the interior of the pot 18. The pipe 88 has a control valve 89 disposed therein and normally closed to prevent communication of the interior of the pot 18 with an enlarged portion 90 of a substantially vertical exhaust duct 91, which has a circular cross section. A solenoid 92 controls the position of the control valve 89 in response to a timer, which is supported on the slanting wall 15 of the fryer.

The timer is set in accordance with the food being fried within the pot 18 as soon as possible after the pot 18 is pressure sealed by the cover 68. Thus, the timer determines how long the pressure within the interior of the pot 18 is maintained. Of course, during a frying operation, any excess pressure beyond nine p.s.i. is released by the exhaust vent 84 as previously mentioned.

The enlarged portion 90 of the exhaust duct 91 is substantially larger than the pipe 88 as clearly shown in FIGURE 4. Accordingly, the enlarged portion 90 of the duct 91 functions as a diffusion chamber to reduce the pressure of the steam and oil vapors entering the duct 91 from the pipe 88.

As shown in FIGURES 4 and 5, a baffle 93 is mounted within the enlarged portion 90 of the exhaust duct 91 to the limit egress of oil and steam through the exhaust duct 91 from the interior of the pot 18. Thus, the baffle 93 will prevent some of the oil and steam from escaping through the exhaust duct 91, which extends above the vertical portion 67 of the exhaust flue 65 as shown in FIGURES 1 and 4.

The exhaust ducts 86 and 91 are disposed in contiguous relation with the sides of the exhaust flue 65 as shown in FIGURE 4. Thus, some of the heat of the combustion products, which escape through the exhaust flue 65, is transferred to the exhaust ducts 86 and 91. Accordingly, if there should be any congealing of oil or freezing of moisture within the ducts 86 and 91, the heat within the exhaust flue 65 returns them to liquids.

A shroud 94 surrounds the exhaust flue 65 and the exhaust ducts 86 and 91 in spaced relation thereto. The shroud 94 prevents the exhaust flue 65, which is quite hot, from directly contacting a wall if the fryer is positioned with the exhaust flue 65 adjacent a wall. The shroud 94 also prevents any accidental direct contact with the exhaust flue 65 to prevent one from being severely burned.

It should be understood that an exhaust fan or a hood would normally be placed above the exhaust ducts 86 and 91 and the exhaust flue 65 to remove the vapors therein. However, it should be understood that the exhaust flue 65 and the exhaust ducts 86 and 91 would be vented directly to the exterior by suitable duct means (not shown).

Since any steam and/or oil, which escaps from the pot 18 into the exhaust duct 86 may not have sufficient momentum to be carried out of the exhaust duct 86, the condensates will eventually trickle to the bottom of the exhaust duct 86. To remove the condensates from the exhaust duct 86, a pipe 95 is connected to the bottom thereof and also is connected to a lower portion of the exhaust duct 91, which also has condensates therein. The bottom of the exhaust duct 91 is open to provide communication to a suitable collecting receptacle or to a drain pipe, for example.

A thermostat 96 (see FIGURE 2) extends into the interior of the pot 18 to measure the temperature of the cooking fat therein. The thermostat 96 is set to the desired temperature by a thermostat control, which is supported on the slanting wall 15 of the fryer. Thus, depending upon the product being fried within the pot 18, the selected temperature of the cooking fat within the pot 18 is maintained through the thermostat 96 controlling the amount of gas supplied to the burners 48 from the inlet pipe 52.

The bottom wall 22 of the pot 18 has a drain pipe 97 extending downwardly therefrom. The drain pipe 97 has a first valve (not shown) therein. The first valve is opened when it is desired to drain the cooking fat from the pot 18. The cooking fat is collected within a container (not shown), which forms part of a filtering system as specifically shown and described in my U.S. Patent No. 3,159,095. The cooking fat is returned to the pot 18 by a pump (not shown), which connects with the drain pipe 97 above the first valve. Between the outlet of the pump and the drain pipe 97, a second valve (not shown) is disposed. The second valve is opened and the first valve is closed when the pump returns the cooking fat to the pot 18.

As shown in FIGURE 3, a cup 98 is disposed on the interior of the fourth portion 31 of the rear wall 26 adjacent its junction with the side wall 23. The cup 98 collects moisture when the cover 68 is moved to the open position after food has been fried in the pot 18. This is more particularly shown and described in the aforesaid U.S. Patent No. 2,914,063.

Considering the operation of the present invention, the cooking fat is supplied to the pot 18 and heated to the desired temperature range by the gas burners 48 as selected by the thermostat control on the slanting wall 15 of the fryer. As previously set forth, the directions of the outlets of the burners 48 are related to each other so that heat is directed to the upper part of the first or curved portion 32 of the front wall 25. This provides a cold zone in the lower portion of the pot 18 where there is no turbulence.

The amount of cooking fat within the pot 18 is dependent upon the quantity of food to be fried as described in the aforesaid U.S. Patent No. 2,914,063. Thus, more cooking fat is utilized when a smaller quantity of food is fried.

When the temperature of the fat within the pot 18 is at the desired temperature, the food to be fried is placed within the pot 18. It may be supported within a wire basket, for example, which rests on the first part 28 of the second portion of the rear wall 26 and the upper part of the curved portion 32 of the front wall 25. This upper part is substantially parallel to the bottom wall 22 and in the same horizontal plane as the first part 28 of the second portion of the rear wall 26.

The cover 68 is then secured in pressure sealing relation with the top of the pot 18 to form a pressurized container. As soon as possible after the pot 18 is pressured sealed, the timer on the slanting wall 15 of the fryer is set to the required length of frying time for the food being fried. With the frying time set, the food is fried in the cooking fat for the required time at a pressure not exceeding nine pounds. Whenever the pressure exceeds nine pounds, the exhaust vent 84 opens its control valve to allow relief of pressure through the pipes 82 and 85.

The thermostat 96 insures that the temperature of the cooking fat within the pot 18 is maintained in the desired temperature range. Thus, the temperature of the cooking fat and the pressure at which the food is being fried are automatically controlled. Furthermore, the time period of the frying cycle is determined since complete release of pressure occurs through the pipe 88 when the solenoid 92 is energized by the timer to open the control valve 89 at the completion of the frying time period.

An audible or visual signal also is actuated when the solenoid 92 is energized at the completion of the frying period. This indicates to the operator that the frying cycle is complete and the food is ready to be removed from the pot 18. This is accomplished by releasing the cover 68 from its pressure sealing relation with the pot 18.

When the last operation of the night is completed, the oil within exhaust ducts 86 and 91 and the moisture within the exhaust ducts 86 and 91 may be subjected to low temperature depending on the location of the fryer. For example, if the exhaust ducts 86 and 91 are disposed adjacent an outer wall, the oil may congeal and the moisture may freeze.

Upon starting the operation again, the products of combustion from the heating chamber 38 escape through the exhaust flue 65 before pressure within the pot 18 increases sufficiently to be released through the exhaust ducts 86 and 91. Thus, if either oil has congealed or moisture has frozen in the ducts 86 and 91, the heat within the vertical portion 67 of the exhaust flue 65 returns the oil and the moisture to their liquid states.

An advantage of this invention is that it permits the use of a pressurized fryer with gas at the energy source. Another advantage of this invention is that blocking of the exhaust ducts to prevent relief of pressure from the pot is eliminated.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

Having thus described my invention, I claim:

1. A pressurized deep fat fryer including a pressure sealed pot adapted to receive cooking fat for frying food, said pot having its lower portion of substantially smaller area than the remainder of said pot, said lower portion of said pot being formed by a bottom wall, a pair of parallel walls extending upwardly from said bottom wall and substantially perpendicular thereto, a curved wall joining one end of each of said parallel walls and extending upwardly from said bottom wall, and a wall extending upwardly from said bottom wall to join the other end of each of said parallel walls and being substantially perpendicular to each of said parallel walls and to said bottom wall, said lower portion having a substantially rectangular cross sectional area of increasing size from said bottom wall, means to apply gas heat to the upper part of said curved wall of said pot, an exhaust flue to carry off the products of combustion from the gas heat, first duct means connected to the interior of said pot for venting said pot when the pressure in said pressure sealed pot exceeds a predetermined value, second duct means connected to the interior of said pot for venting said pot when said pot has been pressure sealed for a selected period of time, and each of said first duct means and said second duct means having a portion disposed in heat exchange relation with said exhaust flue to prevent freezing of moisture and congealing of cooking fat in each of said first duct means and said second duct means.

2. A pressurized deep fat fryer including a pot adapted to receive cooking fat for frying food, means to pressure seal said pot, means to apply gas heat to said pot to maintain at least the cooking fat in the upper portion of said pot at a temperature to fry food disposed within said pot, an exhaust flue to carry off the products of combustion from the gas heat, first duct means connected to the interior of said pot for venting said pot when the pressure in said pressure sealed pot exceeds a predetermined value, second duct means connected to the interior of said pot for venting said pot when said pot has been pressure sealed for a selected period of time, and each of said first duct means and said second duct means having a portion disposed in heat exchange relation with said exhaust flue to prevent freezing of moisture and congealing of cooking fat in each of said first duct means and said second duct means.

3. A pressurized deep fat fryer including a pot adapted to receive cooking fat for frying food, means to pressure seal said pot, a heating chamber having the lower portion of said pot disposed therein, gas heating means disposed within said heating chamber and directing heat to maintain at least the upper portion of said pot at a temperature to fry food disposed within said pot, said upper portion including part of said pot disposed within said heating chamber, an exhaust flue extending from said heating chamber to carry off the products of combustion from said heating chamber, first duct means connected to the interior of said pot for venting said pot when the pressure in said pressure sealed pot exceeds a predetermined value, second duct means connected to the interior of said pot for venting said pot when said pot has been pressure sealed for a selected period of time, and each of said first duct means and said second duct means having a portion disposed in heat exchange relation with said exhaust flue to prevent freezing of moisture and congealing of cooking fat in each of said first duct means and said second duct means.

4. A fryer according to claim 2 in which each of said first and second duct means has an enlarged portion to function as a diffusion chamber to reduce pressure in each of said first and second duct means.

5. A fryer according to claim 3 in which each of said first and second duct means has an enlarged portion to function as a diffusion chamber to reduce pressure in each of said first and second duct means.

6. A pressurized deep fat fryer including a pot adapted to receive cooking fat for frying food, means to pressure seal said pot, means to apply gas heat to said pot to maintain at least the cooking fat in the upper portion of said pot at a temperature to fry food disposed within said pot, an exhaust flue to carry off the products of combustion from the gas heat, first and second duct means connecting the interior of said pot with the exterior thereof, means to maintain said first duct means closed except when the pressure in said pot exceeds a predetermined value, means to maintain said second duct means closed until a predetermined time period elapses after said pot is pressure sealed by said sealing means, and each of said first duct means and said second duct means having a portion disposed in heat exchange relation with said exhaust flue to prevent freezing of moisture and congealing of cooking fat in each of said first duct means and said second duct means.

7. A pressurized deep fat fryer including a pot adapted to receive cooking fat for frying food, means to pressure seal said pot, a heating chamber having the lower portion of said pot disposed therein, gas heating means disposed within said heating chamber and directing heat to maintain at least the upper portion of said pot at a temperature to fry food disposed within said pot, said upper portion including part of said pot disposed with said heating chamber, an exhaust flue extending from said heating chamber to carry off the products of combustion from said heating chamber, first and second duct means connecting the interior of said pot with the exterior thereof, means to maintain said first duct means closed except when the pressure in said pot exceeds a predetermined value, means to maintain said second duct means closed until a predetermined time period elapses after said pot is pressure sealed by said sealing means, and each of said first duct means and said second duct means having a portion disposed in heat exchange relation with said exhaust flue to prevent freezing of moisture and congealing of cooking fat in each of said first duct means and said second duct means.

8. A fryer according to claim 6 in which each of said first and second duct means has an enlarged portion to function as a diffusion chamber to reduce pressure in each of said first and second duct means.

9. A fryer according to claim 7 in which each of said first and second duct means has an enlarged portion to function as a diffusion chamber to reduce pressure in each of said first and second duct means.

References Cited by the Examiner

UNITED STATES PATENTS

| | | | |
|---|---|---|---|
| 204,471 | 6/1878 | Alberdingk | 126—345 |
| 526,091 | 9/1894 | White | 126—345 |
| 2,219,949 | 10/1940 | Childs | 99—403 X |
| 2,778,736 | 1/1957 | Wagner. | |
| 2,914,063 | 11/1959 | Wagner | 126—381 |
| 2,918,861 | 12/1959 | Phelan et al. | 99—408 |
| 3,217,633 | 11/1965 | Anetsberger | 126—390 X |

FOREIGN PATENTS 807,354   1/1959   Great Britain.

FREDERICK L. MATTESON, JR., *Primary Examiner.*

ROBERT A. DUA, *Examiner.*